June 8, 1965  N. S. MOSS ETAL  3,187,527
THEFT PREVENTION DEVICES
Filed March 8, 1962  2 Sheets-Sheet 1

INVENTORS
NORMAN SIDNEY MOSS
PHILIP SWINGEWOOD JEAVONS
DAVID GEORGE COLEMAN

BY Irwin S. Thompson
ATTORNEY

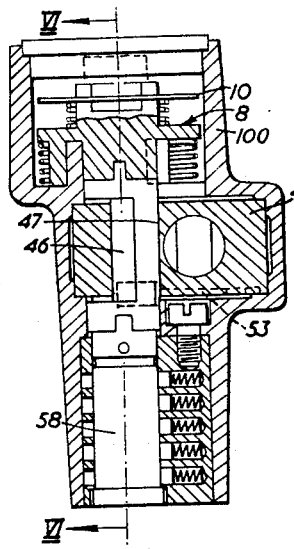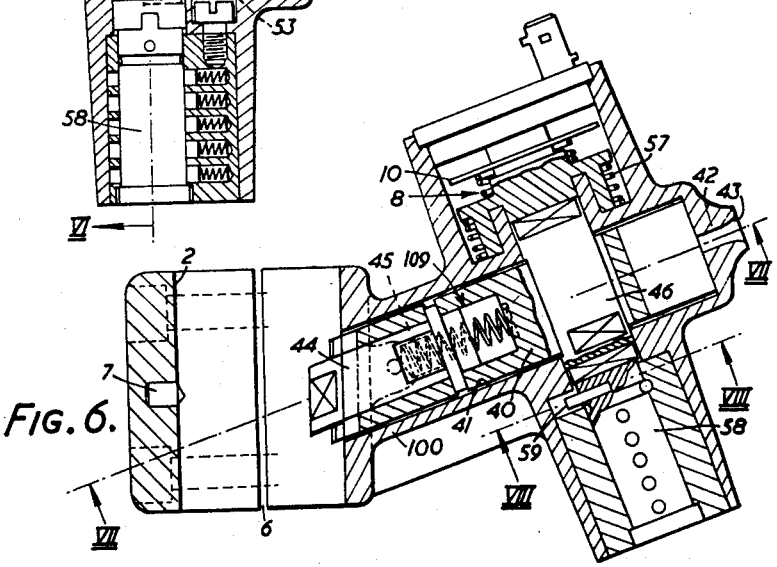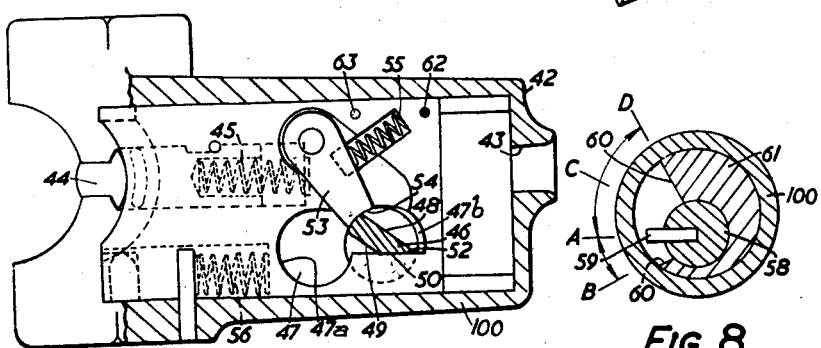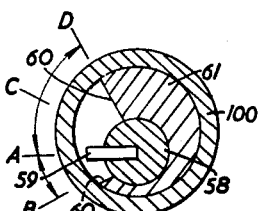

United States Patent Office 3,187,527
Patented June 8, 1965

3,187,527
THEFT PREVENTION DEVICES
Norman Sidney Moss, Shirley, Solihull, Philip Swingewood Jeavons, Birmingham, and David George Coleman, Sheldon, Solihull, England, assignors to Wilmot-Breeden Limited, Birmingham, England
Filed Mar. 8, 1962, Ser. No. 178,492
Claims priority, application Great Britain, Aug. 21, 1961, 30,024/61
13 Claims. (Cl. 70—252)

This invention relates to theft prevention devices for use with motor vehicles, and in particular to such devices of the type which can be operated by means of a key to control a vital electrical circuit of the vehicle and also act to render inoperable a vital part thereof. These devices normally control the vehicle ignition circuit and act to lock the steering column of the vehicle.

According to the invention a theft prevention device for a motor vehicle has a key-operated switch mechanism and a directly manually-operated locking mechanism adapted when actuated to render a vital mechanical part of the vehicle inoperable, said mechanisms being interlocked so that the one cannot be operated unless the other is in the inoperative position and so that when the locking mechanism is in the locked position it automatically returns to the inoperative or unlocked position when the key is turned in the direction opposite to that required to operate the switch mechanism.

The locking mechanism may project from a housing of the device so that it is accessible to the fingers of the driver of the vehicle for operation of that mechanism, although as a safety feature the locking mechanism may be entirely contained within the housing of the device and accessible for said direct manual operation through an aperture in the housing. For operation of the locking mechanism in the latter case it is necessary for the driver to insert a suitable member, which may be the key itself after the latter has been withdrawn from the switch, to operate the locking mechanism. In either case the important feature is that the locking mechanism can be manually operated directly in the sense that no key or other special tool is necessary.

A device in accordance with the invention can be directly operated manually to lock the vehicle without use of a key without any danger, due to the interlocking feature, of the locking mechanism being actuated when the engine is running or the vehicle being driven normally. It is also impossible to actuate the switch mechanism to start the engine unless the locking mechanism is inoperative.

Preferably the locking mechanism comprises a slidable control member, which serves to urge the locking bolt resiliently towards the steering column of the vehicle when the device is fitted. The control member may be a projecting pushbutton or be slidably mounted within the housing of the device and accessible through said aperture, and the locking bolt is conveniently mounted in the control member itself and spring loaded therefrom towards the steering column.

The control member is preferably spring loaded outwardly to the inoperative position, and it is conveniently formed to cooperate with an element of the switch mechanism to provide said interlocking feature. The latter element may be a shaft interconnecting a key-operated lock of the switch mechanism with the switch proper.

The invention will now be further described with reference to the accompanying drawings which illustrate, by way of example, two theft prevention devices in accordance with the invention, and in which.

Figures 1, 3:
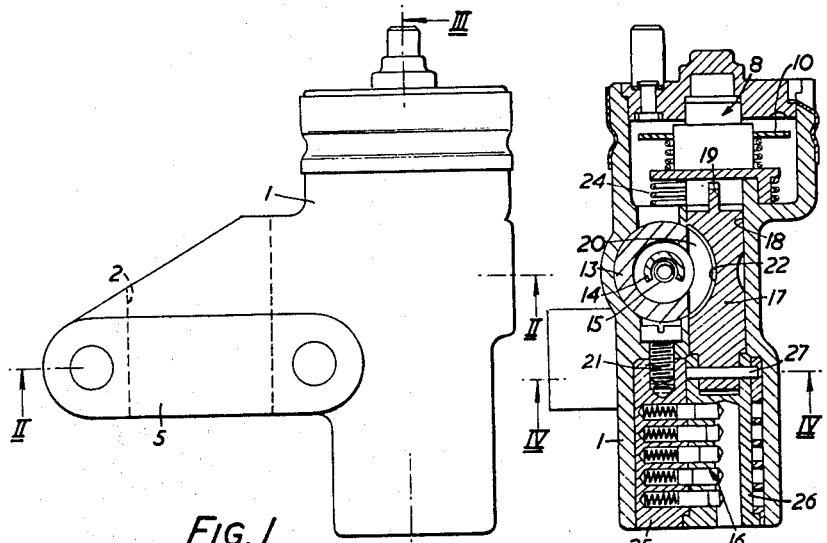
FIGURE 1 is a plan view of one of the devices.
FIGURE 3 is a sectional view on the line III—III in FIGURE 1.
Figure 9:
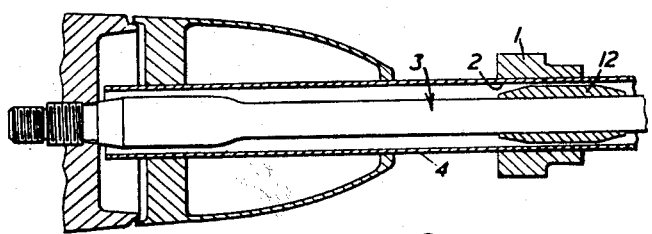

FIGURE 5 is a sectional view corresponding to that of FIGURE 3 but of the other device, FIGURE 6 is a sectional view on the line on VI—VI in FIGURE 5, FIGURE 7 is a part-sectional view on the line VII—VII in FIGURE 6, FIGURE 8 is a sectional view on the line VIII—VIII in FIGURE 6, and FIGURE 9 is a somewhat diagrammatic cross-sectional view of a vehicle steering column showing how either device is mounted on the column.

One device has a die-cast housing 1 formed with a mounted bore 2 through which the steering column 3 passes when the device is fitted. The housing 1 surrounds the usual tubular outer casing 4 of the column 3, and the housing of the device of FIGURE 1 is formed with a mounting flange 5 which enables the device to be bolted to the vehicle body in a position to replace the normal steering column mounting bracket. The housing 100 of the other device is not so formed, and as clearly shown in FIGURE 6 the housing 100 is split at 6 to enable it to be clamped to the casing 4. A pin 7 with a pointed end projects into the bore 2 and engages the casing 4 to prevent the housing 100 turning on the casing 4.

Each device comprises a key-operated switch mechanism 8 and a directly manually-operated locking mechanism 9 or 109, these mechanisms functioning and being interlocked in a manner described hereinafter.

The switch mechanism 8 incorporates a combined ignition and starter switch of generally known form comprising two switch plates arranged at one side of the housing at 10, and when operated the locking mechanism 9 or 109 locks the steering column 3 to render the vehicle steering inoperative. The locking mechanism enables the column to be locked in more than one position, and to this end it can engage any one of an angularly spaced series of recesses 11 formed in a sleeve 12 fixed to and surrounding the central shaft of the steering column 3 (see particularly FIGURES 2 and 9).

Figures 2, 4:
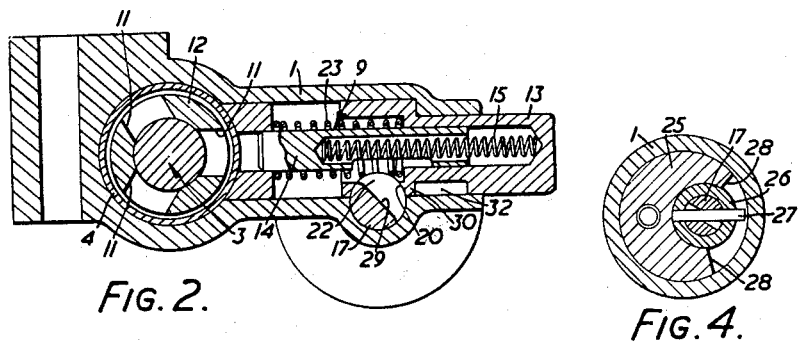
FIGURE 2 is a sectional view on the line II—II in FIGURE 1.
FIGURE 4 is a sectional view on the line IV—IV in FIGURE 3.

Referring now specifically to the device illustrated in FIGURES 1 to 4, the locking mechanism comprises a projecting pushbutton 13 slidably mounted in the housing 1 on an axis at a right angle to the column 3 and in the normal or inoperative position the pushbutton 13 projects outwardly from the housing 1. Within the pushbutton 13 a sliding bolt 14 is coaxially and slidably arranged, the bolt 14 having a maximum projection from the inner end of the pushbutton 13 (as shown in FIGURE 2) and being spring loaded from the pushbutton by a compression spring 15.

As the pushbutton 13 projects from the housing it is accessible to the fingers of the driver for direct manual operation of the locking mechanism 9. When the pushbutton 13 is depressed so that it is substantially flush with the housing 1, in which position it is retained in a manner described hereinafter, the bolt 14 is resiliently urged by the spring 15 into engagement with the sleeve 12 for locking engagement with one of the locking recesses 11.

The switch mechanism 8 comprises a pin-tumbler type key-operated lock 16 which is connected through a shaft 17 rotatably mounted in a cross bore 18 in the housing 1. At its ends the shaft 17 is connected to the lock 16 and the switch 10 respectively, at the end 19 by a tongue and slot connection so that in effect the shaft 17 is universally jointed and accommodates some malalignment of the parts. The shaft 17 extends across the pushbutton 13 in a direction that forms a right angle with the direction in which the axis of the latter extends.

The shaft 17 has a maximum circular cross-section, and over a portion of the length of the pushbutton 13 which is coextensive when in the operative position with the shaft 17 the pushbutton 13 is cut away at 20 to allow just sufficient clearance for passage of the maximum circular shaft section; over a length adjacent the pushbutton 13 in the position illustrated, the shaft 17 is also cut away at 22 in a manner to be described. Thus, when the locking mechanism 9 is inoperative the pushbutton 13 does not obstruct turning movement of the shaft 17 by means of a key inserted in the lock 16 to switch on the vehicle ignition and start the engine by means of the switch 10.

At 22 the shaft is cut away in a manner which allows just sufficient clearance for the normal outer cylindrical surface of the pushbutton 13 when the lock 16, and hence the shaft 17, is turned through an angle of approximately 45° in the reverse direction to that required to actuate the switch 10. Thus, when the shaft 17 is turned in this manner in the reverse direction it does not obstruct return movement of the pushbutton 13 under the action of a pushbutton return spring 23 within the housing 1; such return movement occurs when the shaft 17 is turned in the reverse direction if the locking mechanism 9 is in the operative or locking position.

A torsion spring 24 centres the shaft 17 so that with the key removed from the lock 16 the shaft takes up a normal resting position, as shown in the drawings, intermediate the position to which it is turned to allow return movement of the pushbutton 13 and the position to which it must be turned in the positive or switching direction to switch on the ignition. The body 25 of the lock 16 is fixed in the housing 1 by a screw 21, and at the adjacent end of the shaft 17 the cylinder 26 of the lock 16 and the shaft 17 are connected by a cross-pin 27 with a small degree of angular lost motion. As shown particularly in FIGURE 4 the projecting end of the pin 27 moves in a cut-out recess in the lock body 25, and engagement of the pin 27 with faces 28 on the lock body limits turning movement of the shaft 17 in both directions.

In the resting position illustrated, the shaft 17 engages a cut-out section 20 of the pushbutton 13 in a manner such that it presents a ramp-like surface 29 facing outwardly so that it is engaged by the pushbutton 13 as the latter is depressed. The pushbutton 13 has a lip 30 which rides along the surface 29 and turns the shaft 17 against the spring loading of the latter, thus taking up said lost motion, until the lip 30 clicks into position over the shaft 17 which is then returned to the resting position by the torsion spring 24. Thus, the pushbutton 13 is retained by the shaft 17 in the operative or locked position until the shaft 17 is turned in the reverse direction in the manner already described.

Outwardly of the lip 30 the pushbutton is slightly recessed at 32 to accommodate the shaft 17 when the lip 30 is moved inwardly of the shaft 17 on depression of the pushbutton 13. The recess 32 is only of sufficient depth for this purpose, so that there is insufficient clearance to allow the shaft 17 to be turned in the switching direction to actuate the switch 10. Thus the switch and locking mechanisms 8 and 9 are completely interlocked so that the hazardous circumstance of an attempt to start and drive the vehicle with the steering column 3 locked cannot arise. If the column 3 is locked by the locking mechanism 9 the ignition circuit must be open and cannot be closed until the mechanism 9 has first been released by turning the ignition key in the reverse direction.

Referring now specifically to the device illustrated in FIGURES 5 to 9, a control element or slide 40 of rectangular section is slidably mounted within the housing 100 in a slide way 41 disposed at an angle to the axis of the steering column 3. The slide 40 corresponds generally in function to the pushbutton 13 of the first device, and the slide way 41 is closed by an outer end wall 42 cast with the housing 100 and having a central aperture 43 through which the slide is accessible for direct manual operation by means of a suitable member inserted through the aperture. As the slide 40 is not directly accessible to the fingers of the driver there is no danger of accidental or inadvertent operation of the locking mechanism.

A sliding bolt 44 is arranged in the slide 40 with a maximum projection from the inner end of the latter, and as before the bolt 44 is loaded by a compression spring 45. When the slide 40 is moved inwardly to the locking position, in which position it is retained in a manner described hereinafter, the bolt 44 engages one of the locking recesses 11 in the manner already described.

The lock of the switch mechanism 8 is again of the pin-tumbler type connected through a universally jointed shaft 46 to the switch 10, with the shaft 46 extending through an aperture 47 in the slide 40 at a right-angle to the slide way 41. Over a portion of the length of the shaft 46 coextensive with the slide 40 the shaft 46 is cut away to provide a reduced section (see particularly FIGURE 7) bounded on one side by a chordal surface 48 and at the opposite side by two radial surfaces 49 and 50 subtending an obtuse cut-away angle; the radial surface 49 is parallel to the chordal surface 48. The aperture 47 is elongated in the direction of the slide way 41, having a circular inner end portion 47a and a part-circular outer end portion 47b bounded by a chord to provide a flat chordal step 52 with which the shaft 46 engages in a manner to be described.

A pawl 53 is pivotally mounted at one side of the slide 40, being recessed into the latter so as to project into the aperture 47 at a right-angle to the shaft 46. The pawl 53 has a radiused end surface 54 corresponding to the radius of the shaft 46, and the pawl 53 is loaded by a compression spring 55 into a position in which it engages the shaft 46 when the latter is within the portion 47b of the aperture 47.

A return spring 56 within the housing 100 urges the slide 40 outwardly to the inoperative position in which the shaft 46 passes through the aperture portion 47a and hence can be turned freely within that portion to allow operation of the switch mechanism 8. In this position the slide 40 engages the end wall 42, the slide being shown in the operative or locking position in the drawings. As before, the shaft 46 is centred by a torsion spring 57, so that with the key removed from the lock cylinder 58 the shaft 46 takes up a resting position in the aperture portion 47a with the radial surface 50 aligned with the step 52, and the device can now be considered as fully inoperative.

If the slide 40 is moved inwardly to the locking position the shaft 46 moves into the outer aperture portion 47b, and as it does so the chordal surface 48 displaces the pawl 53 which clicks into position behind and engages the shaft 46 (as shown in FIGURE 7) to retain the slide 40 in the locking position. In order to free the locking mechanism 109, as before it is first necessary to turn the key in said reverse direction until the radial surface 49 is aligned with the step 52. In this position the cut-away portion of the shaft 46 is clear of the pawl 53 and the slide 40 is returned by the spring 56 to the inoperative position, the shaft entering the aperture portion 47a in which it can be freely turned in the switching direction to operate the switch 10. When the slide 40 is in the locking position abutment of the radial surface 50 on the step 52 prevents the shaft 46 being turned in the switch operating direction to start the engine.

As with the device first described rotation of the lock cylinder 58 in both directions is limited by engagement of a projecting pin 59 with surface 60 of a cut-away section of the fixed lock body 61.

With reference to FIGURE 8, which can be considered as illustrating the switching operation with both devices, reverse movement of the shaft 46 so that the projecting pin 59 moves from the "OFF" position A to the "UNLOCKED" position B acts to release the slide 40 should it be in the locking position; movement in the starting direction through the position C to the "START" position D switches on the ignition and operates the engine starter, on release of the ignition key the shaft 46 automatically being returned by the torsion spring 57 to the "IGNITION" position C.

As it is not immediately apparent to the eye whether or not the steering column is locked with the second device, an aperture (not shown) is provided in the wall of the housing 100 through which appears a red spot 62 on the slide 40 when the lock is in the locking position. A differently coloured spot 63 is arranged to be visible when the slide 40 is in the inoperative position.

As the slide 40 does not project from the housing 100 there is no danger of it being moved accidentally to the locking position, for example if the vehicle should be coasting downhill with the ignition switched off. As will be seen from FIGURES 6 and 7 the aperture 43 is of rectangular cross-section and the section is chosen so that the ignition key can conveniently be inserted through the aperture to move the slide 40, although it will be appreciated that any other suitable elongated member can be used. The advantage of it becoming habitual to use the ignition key for this purpose will be readily apparent, as it ensures that before locking the steering column the driver will consciously first remove the ignition key from the lock 58, 61.

We claim:

1. A theft prevention device for a motor vehicle having a key-operated switch mechanism and a directly manually-operated locking mechanism adapted when actuated to render a vital mechanical part of the vehicle inoperable, said mechanisms being interlocked so that the one cannot be operated unless the other is in the inoperative position and so that when the locking mechanism is in the locked position it automatically returns to the inoperative or unlocked position when the key is turned in the direction opposite to that required to operate the switch mechanism.

2. A device according to claim 1, wherein a portion of the locking mechanism projects from a housing of the device.

3. A device according to claim 1, wherein the locking mechanism is entirely contained within a housing of a device and is accessible for said direct manual operation through an aperture in the housing.

4. A theft prevention device for a motor vehicle, comprising: a switch mechanism embodying a key-operated lock and a switch-operated shaft turned by said lock; and a manually-operated locking mechanism adapted when actuated to render a vital mechanical part of the vehicle inoperable and comprising a locking bolt for engagement with said mechanical part, and a spring urging the locking mechanism to the unlocked inoperative position; said shaft engaging a member of said locking mechanism to interlock both said mechanisms in such manner that the one cannot be operated unless the other is in the inoperative position and so that when the locking mechanism is in the locked position it automatically returns to the inoperative or unlocked position when the key is turned in the direction opposite to that required to operate the switch mechanism.

5. A device according to claim 4, wherein said spring acts on said locking bolt through a slidable control member.

6. A device according to claim 5, wherein the control member is a projecting pushbutton.

7. A device according to a claim 5, wherein the control member is accessible through an aperture in a housing of the device.

8. A device according to claim 5, wherein the locking bolt is mounted in the control member itself and spring loaded therefrom towards the locking position.

9. A theft prevention device for a motor vehicle, comprising: a switch mechanism, a key-operated lock, and a shaft turned by said lock to operate said switch mechanism; and a manually operable locking mechanism embodying a locking bolt for engagement with a vital movable mechanical part of the vehicle, a slidable control member through which the locking bolt is actuated, and spring means urging the control member and with it the bolt to the inoperative unlocked position; said shaft and control member being so formed that they interengage to provide an interlock for both said mechanisms so that the one cannot be operated unless the other is in the inoperative position and so that when the locking mechanism is in the locked position it automatically returns to the inoperative or unlocked position when the key is turned in the direction opposite to that required to operate the switch mechanism.

10. A device according to claim 9, wherein the longitudinal axes of the control member and said shaft cross, in the region of cross-over both those parts being cut away so that they engage in a manner to provide the interlock.

11. A device according to claim 10, wherein the arrangement is such that return movement of the control member cannot occur until the switch shaft is turned in the reverse direction to that required for switch operation, when the control member is in the locking position the cut-away sections of the control member and the switch shaft engaging to prevent turning of the shaft in the switch-operating direction.

12. A device according to claim 11, wherein said control member has a spring-loaded pawl which engages the cut-away section of the switch shaft to prevent return movement of the control member, when the latter is in the locking position, until the shaft has been turned in said reverse direction.

13. A device according to claim 10, wherein the control member is cut away to provide an aperture through which the switch shaft passes.

References Cited by the Examiner

UNITED STATES PATENTS

| Re. 20,352 | 5/37 | Smith | 70—252 X |
| 1,641,811 | 9/27 | Hershey | 70—252 |
| 2,100,717 | 11/37 | Mabee | 70—252 |
| 2,148,609 | 2/39 | Edwards | 70—252 |

ALBERT H. KAMPE, *Primary Examiner.*